No. 814,631. PATENTED MAR. 6, 1906.
F. L. O. WADSWORTH.
MANUFACTURE OF GLASS.
APPLICATION FILED JUNE 7, 1904.

WITNESSES
Thomas W. Bakewell
Warren W. Swartz

INVENTOR
Frank L. O. Wadsworth

UNITED STATES PATENT OFFICE.

FRANK L. O. WADSWORTH, OF MORGANTOWN, WEST VIRGINIA.

MANUFACTURE OF GLASS.

No. 814,631.    Specification of Letters Patent.    Patented March 6, 1906.

Application filed June 7, 1904. Serial No. 211,499.

*To all whom it may concern:*

Be it known that I, FRANK L. O. WADSWORTH, of Morgantown, Monongalia county, West Virginia, have invented a new and useful Improvement in the Manufacture of Glass, of which the following is a full, clear, and exact description, reference being had to the accompanying drawings, forming part of this specification, in which—

Figure 1:
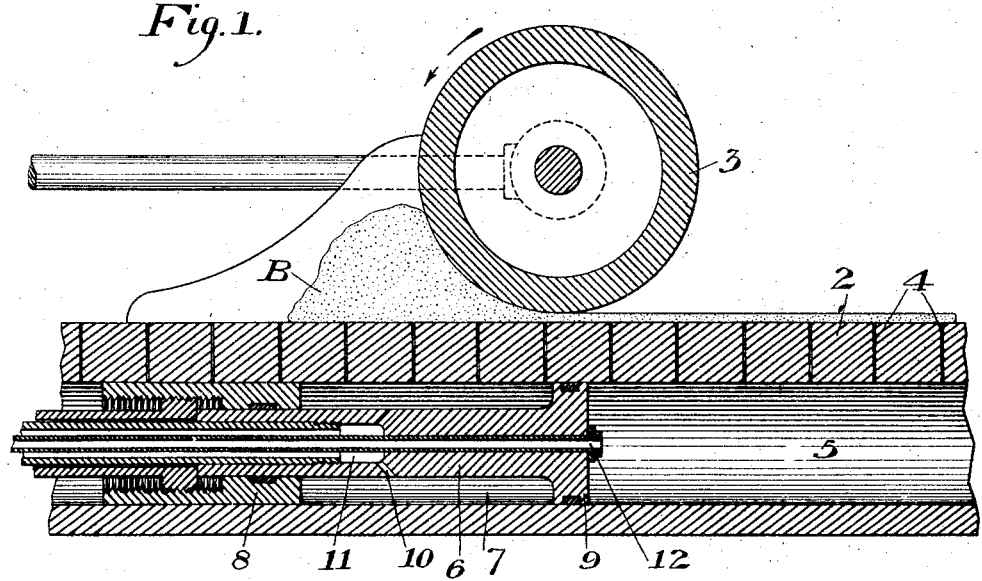
Figure 2:
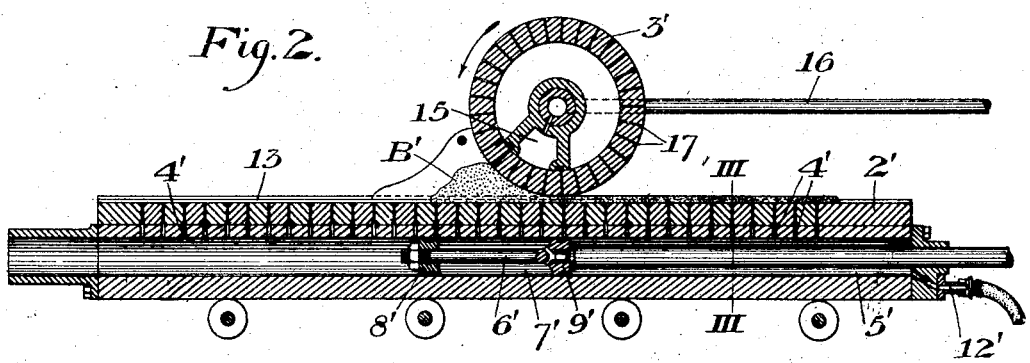
Figure 3:
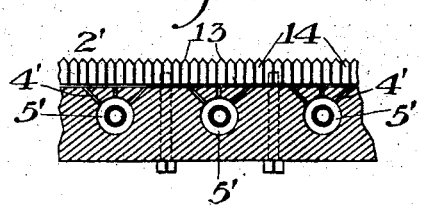

Figure 1 is a vertical section of a roll and rolling-table equipped for the practice of my invention. Fig. 2 is a similar view showing apparatus for the introduction of gaseous fluid at both surfaces of the glass during its formation, and Fig. 3 is a cross-sectional view on the line III III of a portion of the rolling-table shown in Fig. 2.

In rolling sheet-glass the under surface has heretofore been marred by contact with the rolling-table and has been inferior in appearance to the upper surface produced by the roll. The upper surface also has less polish than is produced on glass articles which do not touch metal surfaces during their formation.

It is the purpose of my invention to prevent disfiguring of the glass in this way, and I have discovered that this can be done by interposing between the glass and the surface against which it is formed during the rolling or spreading operation a film of gaseous fluid, preferably steam, which prevents contact of the glass therewith at the moment when the forming pressure is applied. I also preferably exhaust or remove the film of gaseous fluid soon after the glass has been formed.

The drawings show the preferable form of apparatus for the practice of my invention; but those skilled in the art will be able to modify it in many ways.

In the drawings, 2 is a table for rolling glass sheets, and 3 is the forming-roll. The surface of the table has a series of perforations 4, communicating with a cylinder 5, in which is a piston 6, arranged to move under the table at the same rate as the roll. The piston has a chamber 7 between two heads 8 and 9, and the length of this chamber may be varied by projecting or retracting the head 8, as desired. The chamber 7 communicates by ports 10 with a passage 11, through which I supply steam or other gaseous fluid under pressure, and the piston has a second passage 12, which is open at its inner end and is connected with a suitable exhaust mechanism for creating a partial vacuum in the cylinder 5 back of the piston. The table 2 and the roll 3 afford non-absorbent surfaces between which the glass is formed. Being non-absorbent, steam is prevented from condensing or becoming entangled in the body of the table or roll, and thus cracking or injuring the vitreous material formed thereon. When this form of my apparatus is used, the body of glass B is deposited in front of the roll and the roll is moved in the direction of the arrow so as to spread out the glass into sheet form. As the roll advances the piston 6 moves with it, keeping the piston-chamber 7 beneath the points where the glass is pressed against the table, and steam being discharged through the ports 10 and passing through the openings 4 in the table forms a gaseous film which keeps the glass from actual contact with the metal surface of the table at the place where the pressure is applied. As the roll advances with the piston 6 the portions of the table beneath the glass sheet in the rear of the roll are connected by the passages 4 with the cylinder 5, and this piston being in communication with the exhaust mechanism by way of the passage 12 the film of steam is exhausted therethrough. The steam is thus prevented from condensing between the glass and the table. In cases where the gaseous fluid employed is a fixed gas, such as air applied under pressure, the exhaust mechanism may be dispensed with, though I regard it as being in all cases desirable.

In the apparatus shown in Fig. 2 a film of gaseous fluid is interposed between the glass and the forming surface on both sides of the glass sheet. For this purpose in addition to providing the table with means for applying gaseous fluid under pressure and exhausting it therefrom I also provide the roll with like devices. In this figure I show the roll 3' mounted to rotate in stationary bearings, and the pistons 6' are likewise stationary, and the table is movable on the pistons and beneath the roll. The exhaust-ports 12' do not extend through the piston, but through ports formed at the end of the cylinders. The surface of the table has a series of prism projections 13, formed on the surface of metal strips 14, placed side by side and constituting the rolling-surface, their sides being notched so as to afford air-passages which communicate by way of passages 4' with the cylinders 5', there being preferably several of such cylinders formed in the table. The roll is hollow and has within its periphery a chamber 15, fixed to the roll-axle and bearing against the roll's interior surface. A pipe 16 communicates with a passage in the axle and with the interior of the chamber 15. The roll is perforated, as at 17, and as the roll rotates the perforations are brought successively opposite to the chamber 15, and jets of steam are then discharged through them upon the surface of the mass of glass which is being rolled. In this way both the upper and lower surfaces of the glass are kept by an interposed gaseous film from actual contact with the roll and table, and marring of the glass on either side is thereby prevented. When the table is provided with prism projections, they impress a corresponding pattern upon the under side of the glass, and as the glass is kept by the film of steam from contact with the projecting portions of the pattern it will not burn or stick thereto. As the successive portions of the sheet are formed the establishment of communication with the exhaust-chamber 5' draws the prism pattern into intimate contact with the table; but as the glass is then shaped and set it will not be marred by such contact, nor is there any liability of sticking such as would result if it were attempted to spread the sheet directly upon a patterned table without interposing a gaseous film. By the use of the hollow roll and the application of a gaseous film both sides of the sheet are highly finished. The apparatus may therefore be used to advantage not only in the manufacture of glass having patterned or prism surfaces, but in the manufacture of plain sheets as well.

It will be noted that by the means described I limit the point of application of the gaseous film to the surfaces of contact between the mass of unformed glass and the forming surfaces, the point of application of the film moving in unison with the forming pressure. When steam is used, in passing through the table it becomes superheated and dried.

I claim—

1. The method herein described of forming glass, which consists in applying pressure to a body of glass between non-absorbent surfaces, and interposing a gaseous film between the glass and forming-surface at the point of application of pressure; substantially as described.

2. The method herein described of forming glass, which consists in applying pressure to a body of glass, interposing a gaseous film between the glass and forming surface, and discharging the gaseous film before the glass becomes cold; substantially as described.

3. The method herein described of forming glass, which consists in applying pressure to a body of glass, interposing a gaseous film between the glass and forming-surface, and exhausting the gaseous film before the glass becomes cold; substantially as described.

4. The method herein described of forming glass, which consists in applying pressure to a body of glass between non-absorbent surfaces, and interposing steam between the glass and forming-surface at the point of application of pressure; substantially as described.

5. The method herein described which consists in spreading a glass sheet on a forming-surface, interposing a film of gaseous fluid between the surface and the glass at the place of application of the spreading pressure, and discharging the gaseous fluid as the sheet is formed; substantially as described.

6. The method herein described which consists in spreading a glass sheet on a forming-surface, interposing a film of gaseous fluid between the surface and the glass at the place of application of the spreading pressure, and exhausting the gaseous fluid as the sheet is formed; substantially as described.

7. The method herein described which consists in spreading a glass sheet on a forming-surface, interposing a film of gaseous fluid between the surface and the glass at the place of application of the spreading pressure, discharging the gaseous fluid as the sheet is formed, and applying a like gaseous fluid between the opposite side of the glass and its forming-surface; substantially as described.

8. The method of forming glass having a pattern-surface, which consists in spreading a glass sheet over a pattern-forming surface and interposing a film of gaseous fluid, and then discharging the fluid and permitting the formed sheet to come into direct contact with the pattern; substantially as described.

9. The method herein described of forming glass, which consists in applying pressure to a body of glass between non-absorbent surfaces, interposing a gaseous film between the glass and forming-surface, and limiting the point of application of such film to the surface of contact between the mass of unformed glass and the forming-surface; substantially as described.

10. The method herein described of forming glass, which consists in applying pressure to a body of glass between non-absorbent surfaces, and interposing a dried gaseous film between the glass and forming-surface at the point of application of pressure; substantially as described.

In testimony whereof I have hereunto set my hand.

FRANK L. O. WADSWORTH.

Witnesses
 THOMAS W. BAKEWELL,
 H. M. CORWIN.